United States Patent [19]

Suzuki et al.

[11] Patent Number: 5,570,298
[45] Date of Patent: Oct. 29, 1996

[54] DOT PATTERN-EXAMINING APPARATUS

[75] Inventors: Noriyuki Suzuki, Neyagawa; Haruhiko Yokoyama, Osaka, both of Japan

[73] Assignee: Matsushita Electric Industrial Co., Ltd., Kadoma, Japan

[21] Appl. No.: 249,164

[22] Filed: May 25, 1994

[51] Int. Cl.⁶ ...................................................... G06F 17/00
[52] U.S. Cl. ............................................................ 364/525
[58] Field of Search ..................................... 364/525, 514; 382/199, 168–172, 174, 245, 207, 260–266; 358/455, 464; 348/28, 254

[56] References Cited

U.S. PATENT DOCUMENTS

| | | | |
|---|---|---|---|
| 4,567,610 | 1/1986 | McConnell | 382/170 |
| 4,823,194 | 4/1989 | Mishima et al. | 358/455 |
| 4,912,559 | 3/1990 | Ariyoshi et al. | 358/261.1 |
| 4,941,192 | 7/1990 | Mishima et al. | 382/260 |
| 5,257,116 | 10/1993 | Suzuki | 382/199 |
| 5,412,578 | 5/1995 | Takagi et al. | 364/474.34 |

*Primary Examiner*—James P. Trammell
*Attorney, Agent, or Firm*—Ratner & Prestia

[57] ABSTRACT

A dot pattern-examining apparatus examines a dot pattern displayed on a display screen by picking up a two-dimensional image of the display screen and by performing image processing with respect to the dot pattern on the two-dimensional image. An image projection data generating section generates image projection data indicative of a set of density values by accumulating, on a predetermined axis, density values of individual dots of the two-dimensional image of the display screen for each line. Then, a run-length data generating section generates run-length data indicative of a set of combinations of an accumulated density value and a length thereof, based on the image projection data of the two-dimensional image. Thereafter, a run-length data matching section compares the run-length data of the two-dimensional image with a reference run-length data indicating a reference dot pattern and generated in advance by the run-length data generating section, to thereby determine a position having run-length data which most match the reference run-length data as the position where the dot pattern to be examined exists.

4 Claims, 6 Drawing Sheets

IMAGE DATA

PRO. DATA (VALUE : 3 , LENGTH : 4) , (VALUE : 2 , LENGTH : 1)

RUN-LENGTH DATA

TEMPLATE
RUN-LENGTH DATA
(V : 3 , L : 4) , (V : 2 , L : 1)

IMAGA
RUN-LENGTH DATA
(V : 3 , L : 4) , (V : 1 , L : 1)

IMAGE TEMPLATE

DOT PATTERN-EXAMINING APPARATUS

BACKGROUND OF THE INVENTION

1. Field of the Invention

The present invention relates generally to an examining apparatus for examining a visual recognition apparatus and, more particularly, to a dot pattern-examining apparatus for examining whether or not the visual recognition apparatus correctly displays a dot pattern on a display screen by means of liquid crystal, light emitting diodes or the like.

2. Description of Related Art

In order to examine the display function of the visual recognition apparatus which displays a dot pattern by means of the liquid crystal or the light emitting diodes, the dot pattern-examining apparatus picks up and processes the dot pattern formed by the luminescence of the liquid crystal or the light emitting diodes and compares a two-dimensional image of the dot pattern formed on a display screen with a reference dot pattern. In this manner, the dot pattern-examining apparatus examines whether or not the liquid crystal or the light emitting diodes have formed a correct dot pattern.

A conventional dot pattern-examining apparatus is described below with reference to FIGS. 9A and 9B. FIG. 9A depicts a partial image template having a reference dot pattern formed thereon, while FIG. 9B depicts a two-dimensional image of the display screen on which a target dot pattern is displayed.

In order to examine the target dot pattern from among various dot patterns contained in the two-dimensional image by means of image processing, it is necessary for the dot pattern-examining apparatus to find the position of the target dot pattern.

To this end, the conventional dot pattern-examining apparatus first scans the two-dimensional image of the display screen and subsequently compares each of the various dot patterns contained in the two-dimensional image with the reference dot pattern of the partial image template of FIG. 9A. Then, the dot pattern-examining apparatus determines an area having a dot pattern which most matches the reference dot pattern as the area having the target dot pattern.

The conventional dot pattern-examining apparatus generally uses either hardware or software to find the area having the most matching dot pattern. In either case, each of the dot patterns formed on the display screen is directly compared with the reference dot pattern of the partial image template. It is, therefore, necessary to compare dots of the former with those of the latter one by one to determine the degree of matching and, hence, the processing requires much time.

In the method of using the hardware, the use of a large partial image template for high-accuracy examination enlarges the size of the hardware. Thus, this method costs high. The method of using the software requires much processing time and is, hence, impractical. In addition, because partial image data themselves are used as a template, the memory capacity therefor increases.

In some cases, various reference dot patterns are required to examine the corresponding dot patterns contained in the two-dimensional image of the display screen. In this case, if some of the dot patterns to be examined are inclined, it is necessary to additionally prepare a plurality of reference dot patterns having different inclinations for each reference dot pattern. Nevertheless, it is difficult for the conventional dot pattern-examining apparatus to detect such an angular deviation accurately.

Further, if a binary image is used in pattern matching, the apparatus is incapable of making a correct examination in the presence of nonuniformity in illumination. In order to overcome this problem, there is a method of first preparing a background image having illumination nonuniformity and subsequently converting a dot pattern into binary form by calculating the difference in density between the dot pattern and the background image. This method is, however, incapable of coping with illumination nonuniformity which changes with time. In addition, the use of a gray image requires much processing time for pattern matching and, hence, this method is impractical.

SUMMARY OF THE INVENTION

The present invention has been developed to overcome the above-described disadvantages.

It is accordingly an objective of the present invention to provide a dot pattern-examining apparatus which has a high processing speed, can reduce the memory capacity, and is inexpensive.

Another objective of the present invention is to provide the dot pattern-examining apparatus of the abovedescribed type capable of measuring the angular deviation of a dot pattern to be examined and of accomplishing a high-speed examination in the presence of nonuniformity in illumination.

In accomplishing the above and other objectives, the dot pattern-examining apparatus according to the present invention examines a dot pattern displayed on a display screen by picking up a two-dimensional image of the display screen and by performing image processing with respect to the dot pattern on the two-dimensional image. The dot pattern-examining apparatus comprises an image projection data generating section for generating image projection data indicative of a set of density values by accumulating, on a predetermined axis, density values of individual dots of the two-dimensional image of the display screen for each line. The dot pattern-examining apparatus also comprises a run-length data generating section for generating run-length data indicative of a set of combinations of an accumulated density value and a length thereof, based on the image projection data of the two-dimensional image, and a run-length data matching section for comparing the run-length data of the two-dimensional image with a reference run-length data indicating a reference dot pattern and generated in advance by the run-length data generating section, to thereby determine a position having run-length data which most match the reference run-length data as a position where the dot pattern to be examined exists.

The dot pattern-examining apparatus of the above-described construction can appropriately determine the position of the dot pattern to be examined, prior to a configuration examination of the dot pattern.

Advantageously, an edge detecting section is provided for detecting at least one row of dots lying on an edge of a two-dimensional image of the dot pattern, the position of which has been determined by the run-length data matching section, by drawing a plurality of lines on the two-dimensional image of the dot pattern. Furthermore, a straight line approximating section finds an approximate straight line by performing linear approximation with respect to the row of dots, to thereby detect the amount of angular deviation of the edge of the two-dimensional image of the dot pattern from the direction in which the approximate straight line extends.

By so doing, the accuracy in determination of the position of the dot pattern is enhanced.

In another aspect of the present invention, a dot pattern-examining apparatus comprises a dot pattern examining section for examining a dot pattern positioned on a two-dimensional image of a display screen. The dot pattern 10 examining section includes an image data compression means for dividing the two-dimensional image into a plurality of dot portions, and also for replacing each of the plurality of dot portions with a representative pixel having a density generally equal to the density of said each of the plurality of dot portions, to thereby compress image data. The dot pattern examining section also includes a density comparing means for comparing the difference in brightness between neighboring representative pixels with a threshold value to thereby determine edges of the dot pattern to be examined.

The data compression contributes to a prompt configuration examination after the determination of the position of the dot pattern.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 1:
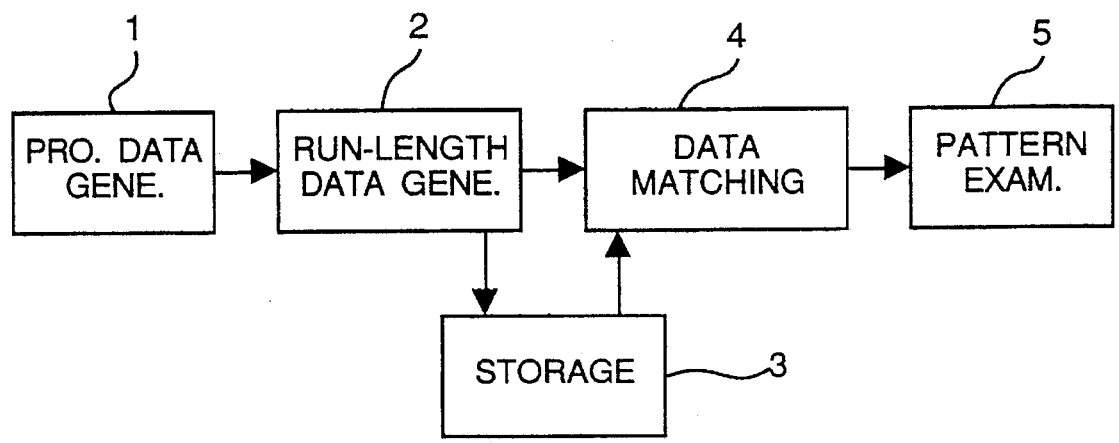
FIG. 1 is a block diagram of a dot pattern-examining apparatus according to a first embodiment of the present invention.
Figure 4:
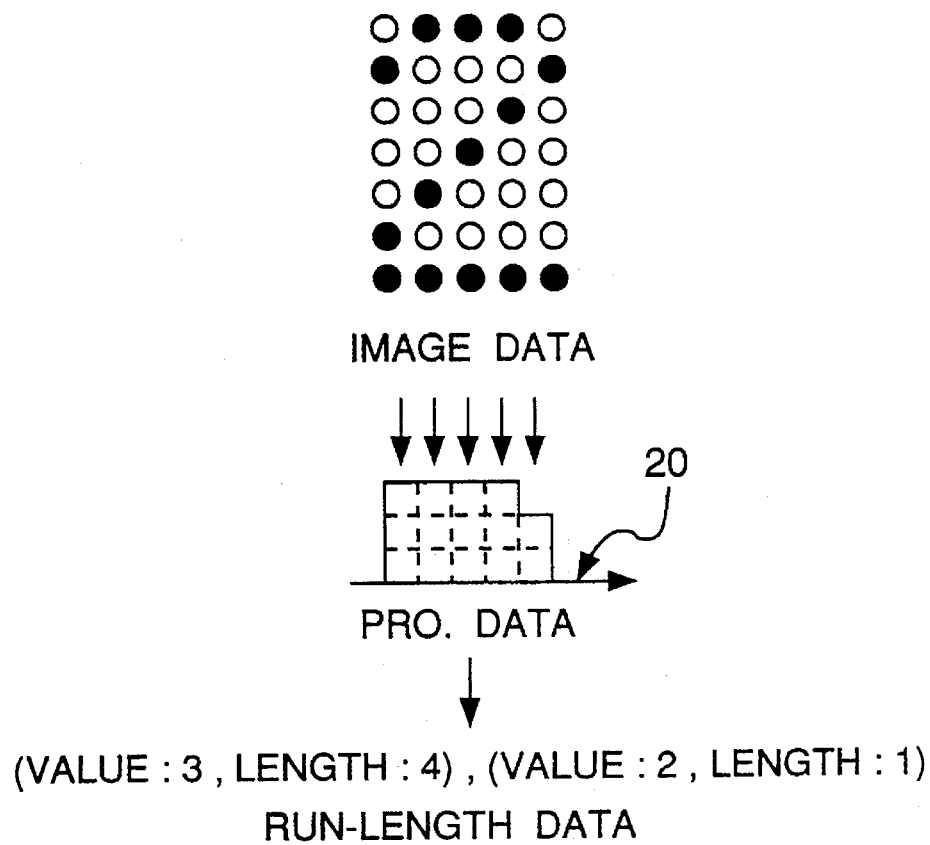
FIG. 4 is a schematic view indicating data conversion performed with respect to a dot pattern to be examined.

FIG. 1 diagrammatically depicts a dot pattern-examining apparatus according to a first embodiment of the present invention which is intended to determine the position of a dot pattern to be examined in X and Y directions. The construction and operation of this dot pattern-examining apparatus are described below with reference to FIGS. 1, 4, and 5.

As shown in FIG. 1, an image projection data generating section 1 converts image data of the dot pattern to be examined into projection data by which the position of the dot pattern can be easily determined.

More specifically, after an image pick-up section (not shown) has picked up a two-dimensional image of a display screen, the image projection data generating section 1 accumulates, on a predetermined axis 20, density values of individual dots of the two-dimensional image for each vertical line, to thereby generate image projection data made up of a set of accumulated density values aligned on the same axis 20.

Whereas the conventional method sequentially compares individual dote of the dot pattern to be examined with those of the reference dot pattern one by one, it is sufficient for the apparatus of FIG. 1 to compare the configuration of the image projection data with that of reference image projection data, because the density values of all the dots of the two-dimensional image are vertically accumulated on the same axis 20 line by line.

Then, a run-length data generating section 2 generates run-length data made up of a set of combinations of an accumulated density value and the length thereof based on the configuration of the image projection data. In the example shown in FIG. 3, the run-length data are (3, 4) and (2, 1), the first and second numerals in parentheses indicating the size of accumulated density values and the number of vertical lines having identical accumulated density values, respectively. The size of the accumulated density values is indicative of the number of high-density dots lying on the same vertical line of the image data. Comparison of such set of data combinations with the corresponding set of data combinations of a reference dot pattern is relatively easy and, hence, the positioning of the dot pattern to be examined can be carried out at a high speed, as described below.

The set of data combinations of the reference dot pattern, i.e, reference run-length data are generated by the run-length data generating section 2 based on projection data of the reference dot pattern, and are stored in a template run-length data storage section 3. A run-length data matching section 4 compares the run-length data of the dot pattern to be examined with the reference run-length data stored in the template run-length data storage section 3, and determines the position of a dot pattern having run-length data that most match the reference run-length data as the position where the target dot pattern exists.

Figure 5:
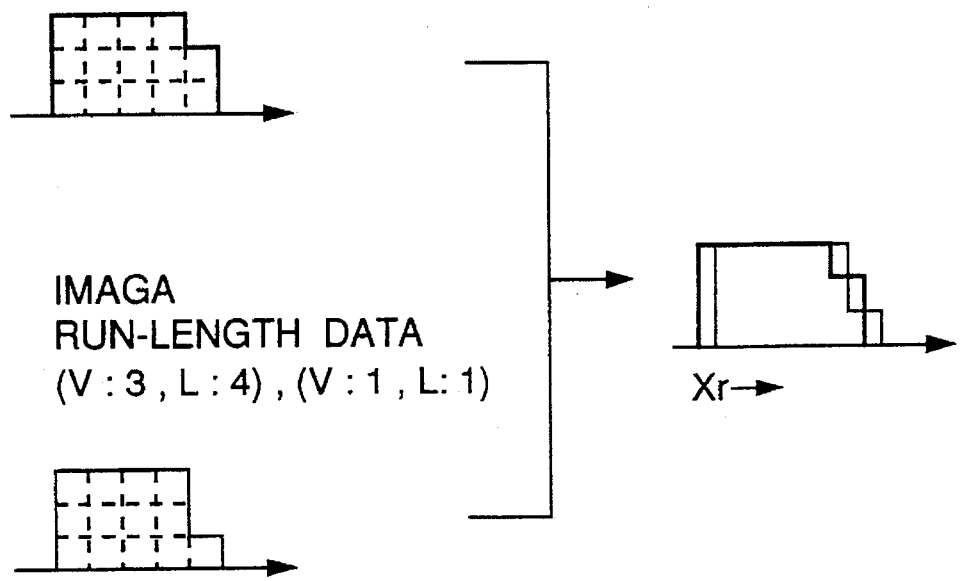
FIG. 5 is a schematic view indicating how to determine the position of the dot pattern.

FIG. 5 depicts the manner in which the degree of matching is examined. As shown in FIG. 5, the left edge of the reference projection data is first aligned with a starting point Xr of an area containing the dot pattern to be examined. During examination in the degree of matching, the starting point Xr is gradually shifted rightwards as viewed in FIG. 5, and the examination in the degree of matching is carried out for each starting point by performing simple residual calculations of both the run-length data of the dot pattern to be examined and the reference run-length data, or by calculating a correlation coefficient indicative of, for example, an angular difference between two vectors when both the run-length data are represented by respective vectors.

Then, a dot pattern examining section 5 examines the configuration of the dot pattern to be examined by comparing a two-dimensional image of the dot pattern positioned as described above with that of the reference dot pattern. If the dot pattern to be examined has a simple configuration, the run-length data can be used for comparison of the configurations of the two-dimensional images.

Figure 2:
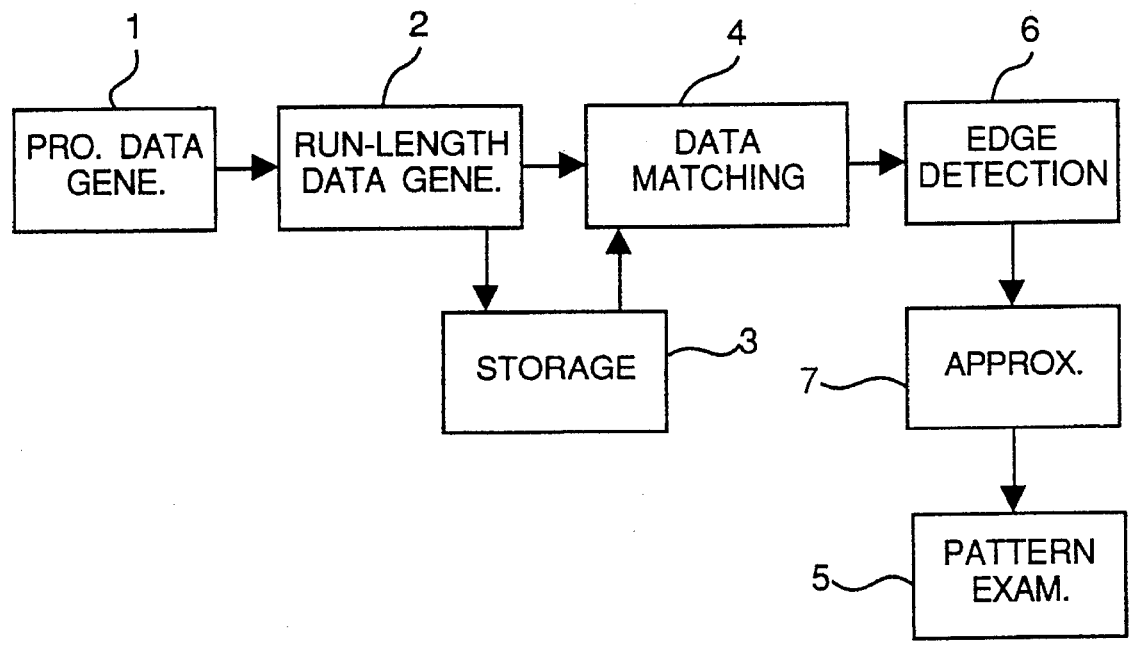
FIG. 2 is a block diagram of a don pattern-examining apparatus according to a second embodiment of the present invention.

FIG. 2 diagrammatically depicts a dot pattern-examining apparatus according to a second embodiment of the present invention. In this embodiment, the amount of angular deviation of the dot pattern to be examined is measured. The construction and operation of this dot pattern-examining apparatus are described below with reference to FIGS. 2 and 6.

The dot pattern-examining apparatus of FIG. 2 differs from that of FIG. 1 in that the former comprises an edge detecting section 6 and a straight line approximating section 7 in addition to the image projection data generating section 1, the run-length data generating section 2, the template run-length data storage section 3, the run-length data matching section 4, and the dot pattern examining section 5.

Figure 6:
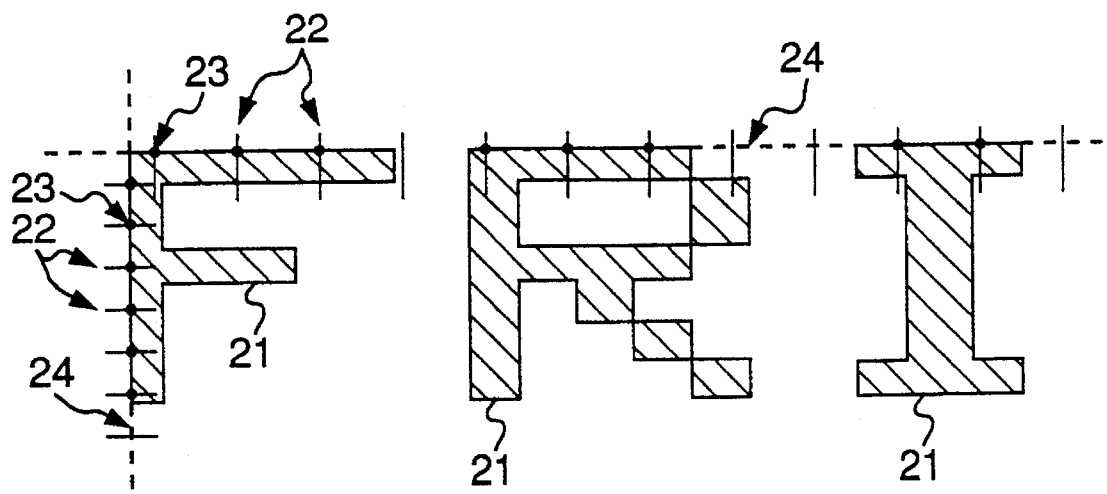
FIG. 6 is a view indicating how to measure the angular deviation of the dot pattern.

As shown in FIG. 6, the edge detecting section 6 finds two rows of dots 23 lying on upper and left borders between bright and dark portions of dot patterns 21 by drawing lines 22 vertically and horizontally on a two-dimensional image of the dot patterns 21, the position of each off which has been determined by the run-length data matching section 4 in the X and Y directions. The two rows of dots 23 indicate the directions of upper and left edges of the dot patterns 21, respectively.

Then, the straight line approximating section 7 finds approximate vertical and horizontal straight lines 24 by performing linear approximation with respect to the two rows of dots 23. The directions of these straight lines 24 accurately indicate the directions of the upper and left edges of the dot patterns 21, respectively.

The amount of angular deviation of the dot pattern to be examined is calculated by the use of at least one of the two straight lines 24, with their intersection set as the origin of a representative XY-coordinate. Of the two straight lines 24, a straight line having more samples than the other or being smaller in deviation from the associated row of dots than the other is used. Alternatively, both the straight lines 24 may be used. In the illustrated embodiment, edge dot calculations are performed on a scale of sub-pixels smaller than pixels constituting each dot. Therefore, if a dot pattern has a clear contrast, an accurate measurement can be accomplished, thus improving examination accuracy.

Figure 3:
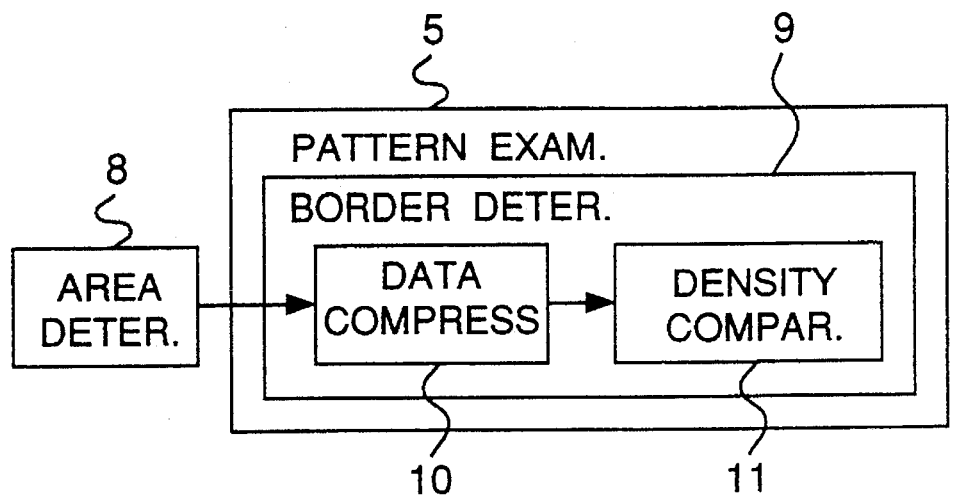
FIG. 3 is a block diagram of a dot pattern-examining apparatus according to a third embodiment of the present invention.

FIG. 3 diagrammatically depicts a dot pattern-examining apparatus according to a third embodiment of the present invention. In this embodiment, after the position of the dot pattern has been determined, information of the two-dimensional image thereof is compressed for subsequent configuration examination. The construction and operation of this dot pattern-examining apparatus are described below with reference to FIGS. 3, 7 and 8.

An examination area determining section 8 shown in FIG. 3 comprises the image projection data generating section 1, the run-length data generating section 2, the template run-length data storage section 3, the run-length data matching section 4, the edge detecting section 6, and the straight line approximating section 7, all of which are shown in FIG. 2. Therefore, a description of these sections 1 through 4, 6, and 7 is omitted. The apparatus of FIG. 3 is characterized by a dot pattern examining section 5 which includes a border determining mechanism 9 in addition to the dot pattern examining section 5 discussed in the first and second embodiments. The border determining mechanism 9 is comprised of an image data compression means 10 and a density comparing means 11.

After the examination area determining section 8 has completed the measurement of the position of the dot pattern in the X and Y directions and the measurement of the amount of angular deviation of the dot pattern, measurement results are corrected as follows.

Figure 7:
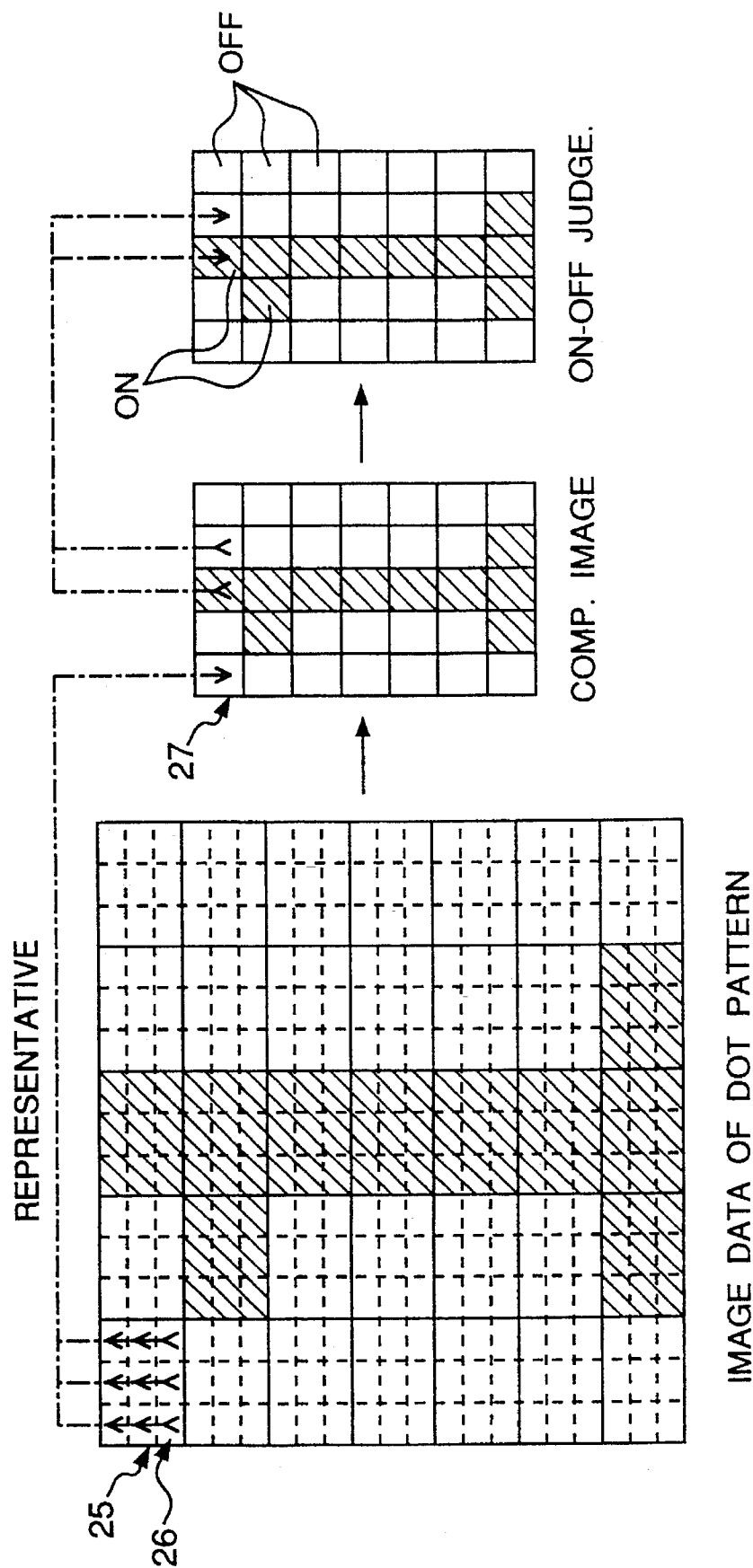
FIG. 7 is a view indicating how to compress image data.

In the dot pattern examining section 5, the image data compression means 10 of the border determining mechanism 9 divides the two-dimensional image of the dot pattern into dot portions 25 each having a size equal to that of each dot of the dot pattern, and replaces the image density of each dot portion 25 indicative of the average brightness of pixels 26 of each dot portion 25 with data of the brightness of one representative pixel 27, thus compressing the information of the two-dimensional image of the dot pattern into a compressed image constituted by a plurality of representative pixels 27, as shown in FIG. 7.

In order to calculate the image density of each dot portion 25, the densities of individual pixels 26 of each dot portion 25 are averaged or sorted for subsequent use of a central value of sorted densities. The pixels may be thinned out in order to increase the speed of calculation.

Figure 8:
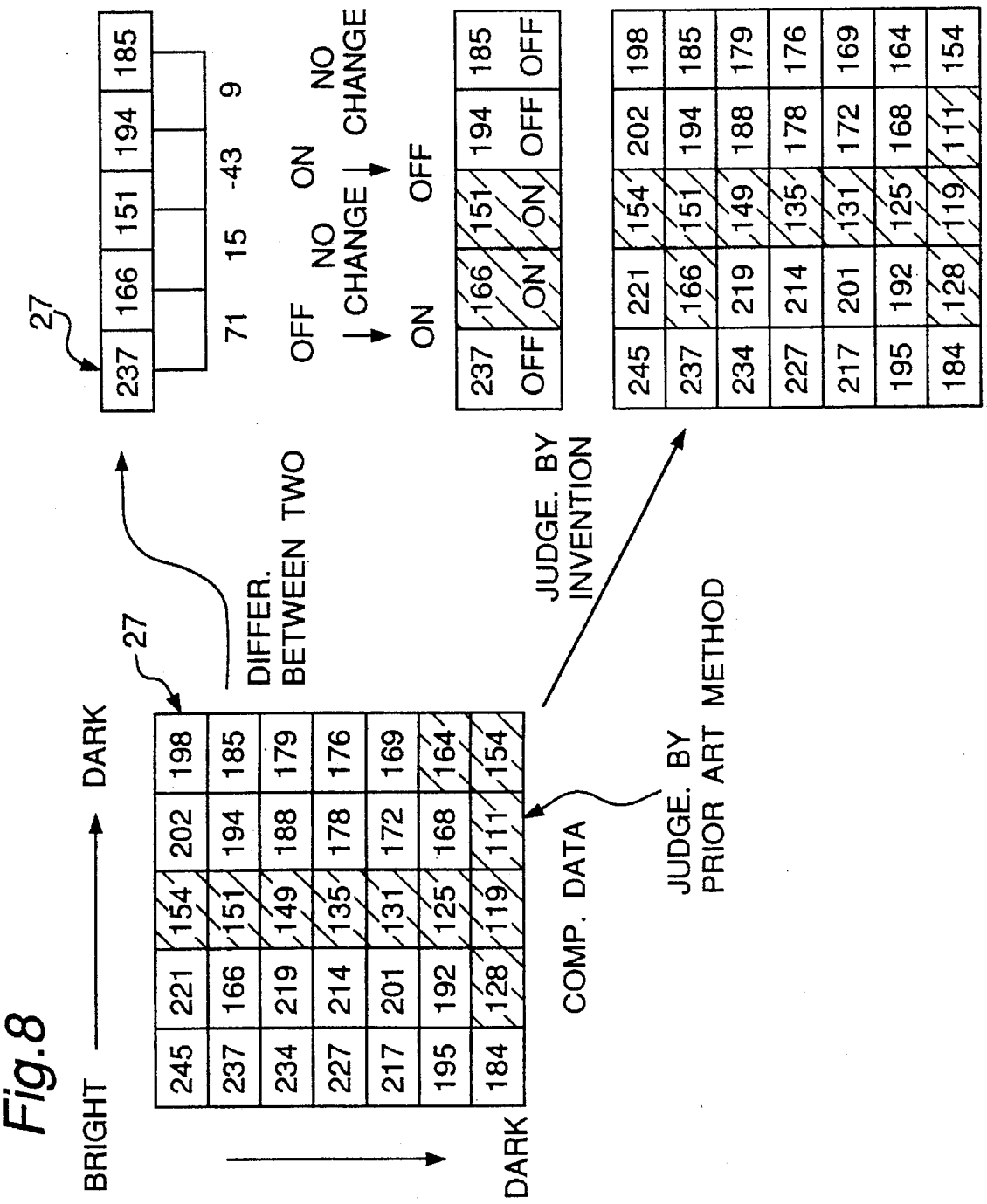
FIG. 8 is a view indicating how to compare densities of neighboring pixels with each other.
Figure 9A:
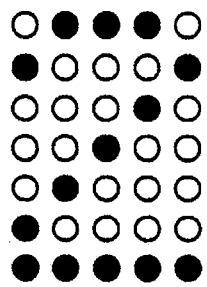
FIG. 9A is a view of a partial image template, having a reference dot pattern formed thereon.
Figure 9B:
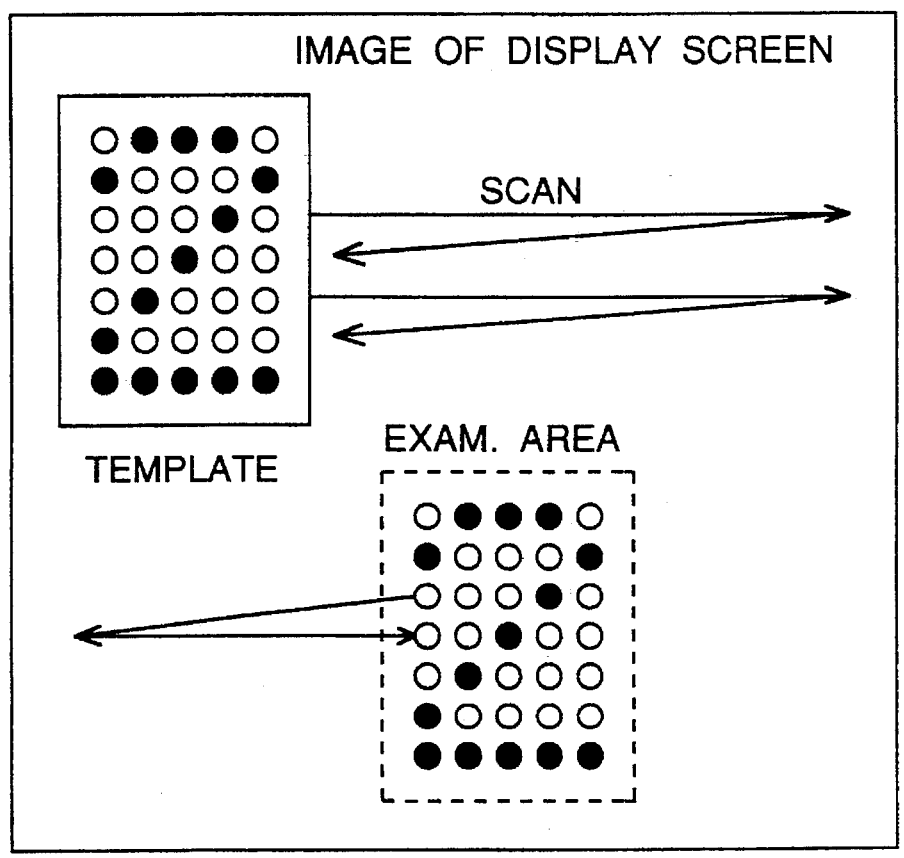
FIG. 9B is a schematic view of a two-dimensional image of a display screen on which the dot pattern to be examined is displayed.

Then, as shown in FIGS. 7 and 8, the density comparing means 11 of the border determining mechanism 9 determines the position of the borders between the bright portions and the dark portions of the two-dimensional image of the dot pattern by comparing the brightness difference between neighboring representative pixels 27 of the compressed image with a threshold value. As shown in FIG. 8, during this processing, the density comparing means 11 calculates the density difference between neighboring representative pixels 27 lying on each of vertical and horizontal lines. In the illustrated embodiment, if the density difference between two neighboring representative pixels 27 is greater than +30, such pixels are rendered to be at "OFF" and "ON" states, respectively. If the density difference is less than −30, they are rendered to be at "ON" and "OFF" states, respectively. If the density difference is greater than −30 but less than +30, it is determined that no change has occurred in the state of the two neighboring representative pixels 27.

Whereas the conventional method compares a plurality of pixels of each dot of a dot pattern with those of a reference dot pattern one by one, it is sufficient for the apparatus of FIG. 3 to compare each representative pixel 27 with the corresponding dot portion of the reference dot pattern by the use of the compressed information of the dot pattern to be examined. Accordingly, the apparatus of FIG. 3 can considerably reduce the amount of operations.

Furthermore, the determination made as shown in FIG. 8 based on the density difference between the neighboring representative pixels allows the dot pattern-examining apparatus to function without being affected by nonuniformity in illumination.

According to the present invention, in calculating the position of a dot pattern to be examined, an inexpensive hardware capable of performing prompt projection calculations can be used. Further, because projection processing considerably reduces image data and the memory capacity, the dot pattern-examining apparatus is capable of performing high-speed processing and becomes inexpensive.

Also, because the amount of annular deviation of the dot pattern to be examined is calculated on a scale of sub-pixels, the measurement accuracy is enhanced, thus enhancing the reliability of the dot pattern-examining apparatus.

In addition, the use of one representative pixel for each dot portion can considerably reduce the amount of operations, and the apparatus of the present invention is not susceptible to nonuniform illumination.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A dot pattern-examining apparatus for examining a dot pattern displayed on a display screen by picking up a two-dimensional image of the display screen and by performing image processing with respect to the dot pattern on the two-dimensional image, said dot pattern-examining apparatus comprising:

an image projection data generating section for generating image projection data indicative of a set of density values by accumulating, on a predetermined axis, density values of individual dots of the two-dimensional image of the display screen for each line;

a run-length data generating section for generating run-length data indicative of a set of combinations of an accumulated density value and a length thereof, based on the image projection data of the two-dimensional image; and a run-length data matching section for comparing the run-length data of the two-dimensional image with a reference run-length data indicating a reference dot pattern and generated in advance by said run-length data generating section, to thereby determine a position having run-length data which most match the reference run-length data as a position where the dot pattern to be examined exists.

2. The dot pattern-examining apparatus according to claim 1, further comprising:

an edge detecting section for detecting at least one row of dots lying on an edge of a two-dimensional image of the dot pattern, the position of which has been determined by said run-length data matching section, by drawing a plurality of lines on the two-dimensional image of the dot pattern; and a straight line approximating section for finding an approximate straight line by performing linear approximation with respect to the row of dots, said straight line approximating section detecting an amount of angular deviation of the edge of the two-dimensional image of the dot pattern from a direction in which the approximate straight line extends.

3. A dot pattern-examining apparatus for examining a clot pattern displayed on a display screen by performing image processing with respect to the dot pattern, said dot pattern-examining apparatus comprising:

a dot pattern examining section for examining the dot pattern positioned on a two-dimensional image of the display screen;

an image data compression means, provided in said dot pattern examining section, for dividing the two-dimensional image into a plurality of dot portions, and also for replacing each of the plurality of dot portions with a representative pixel having a density generally equal to the density of said each of the plurality of dot portions to thereby compress image data; and a density comparing means, provided in said dot pattern examining section, for comparing
   a) a difference in brightness between neighboring representative pixels with
   b) a threshold value
to thereby determine edges of the dot pattern to be examined.

4. A dot pattern-examining apparatus according to claim 3, wherein said density comparing means also renders each of the plurality of dot portions to indicate one of an ON state and an OFF state for subsequent ON-OFF state determination.

* * * * *

UNITED STATES PATENT AND TRADE MARK OFFICE
CERTIFICATE OF CORRECTION

PATENT NO. : 5,570,298
DATED : October 29, 1996
INVENTOR(S) : Suzuki et al.

It is certified that error appears in the above-identified patent and that said Letters Patent is hereby corrected as shown below:

Column 8, line 6, delete "clot" and insert therefor --dot--.

Column 8, line 26, "with" should start a new paragraph.

Signed and Sealed this

Seventeenth Day of June, 1997

*Attest:*

BRUCE LEHMAN

*Attesting Officer*     Commissioner of Patents and Trademarks